United States Patent [19]

Hehl

[11] 4,251,204
[45] Feb. 17, 1981

[54] INJECTION UNIT FOR INJECTION MOLDING MACHINE

[76] Inventor: Karl Hehl, Arthur-Hehl-Strasse 32, 7298 Lossburg 1, Fed. Rep. of Germany

[21] Appl. No.: 91,563

[22] Filed: Nov. 5, 1979

[30] Foreign Application Priority Data

Nov. 4, 1978 [DE] Fed. Rep. of Germany ....... 2847980
Feb. 27, 1979 [DE] Fed. Rep. of Germany ....... 2907556
May 21, 1979 [DE] Fed. Rep. of Germany ....... 2920584

[51] Int. Cl.$^3$ .............................................. B29F 1/00
[52] U.S. Cl. .................................................. 425/582
[58] Field of Search ............... 425/578, 580, 582, 583, 425/587

[56] References Cited

U.S. PATENT DOCUMENTS

| 2,293,304 | 8/1942 | Muller | 425/582 X |
| 2,386,966 | 10/1945 | MacMillin | 425/587 X |
| 2,505,540 | 4/1950 | Goldhand | 425/587 X |
| 4,144,012 | 3/1979 | Pinkley | 425/580 X |

FOREIGN PATENT DOCUMENTS 934392  8/1963  United Kingdom ..................... 425/580

*Primary Examiner*—Thomas P. Pavelko
*Attorney, Agent, or Firm*—Joseph A. Geiger

[57] ABSTRACT

An injection unit adapted for mounting on the die closing unit of an injection molding machine in a number of different orientations, for injection in the die separation plane or perpendicularly thereto, whereby the tie rods of the injection unit are oriented horizontally or vertically within a vertical plane and the granulate supply hopper is mounted on a horizontally extending connecting cylinder with a mechanical conveying device which feeds the granulate from the hopper into the plastification cylinder of the injection unit, the connecting cylinder being angularly adjustable to obtain a vertical hopper axis for all injection unit orientations.

14 Claims, 20 Drawing Figures

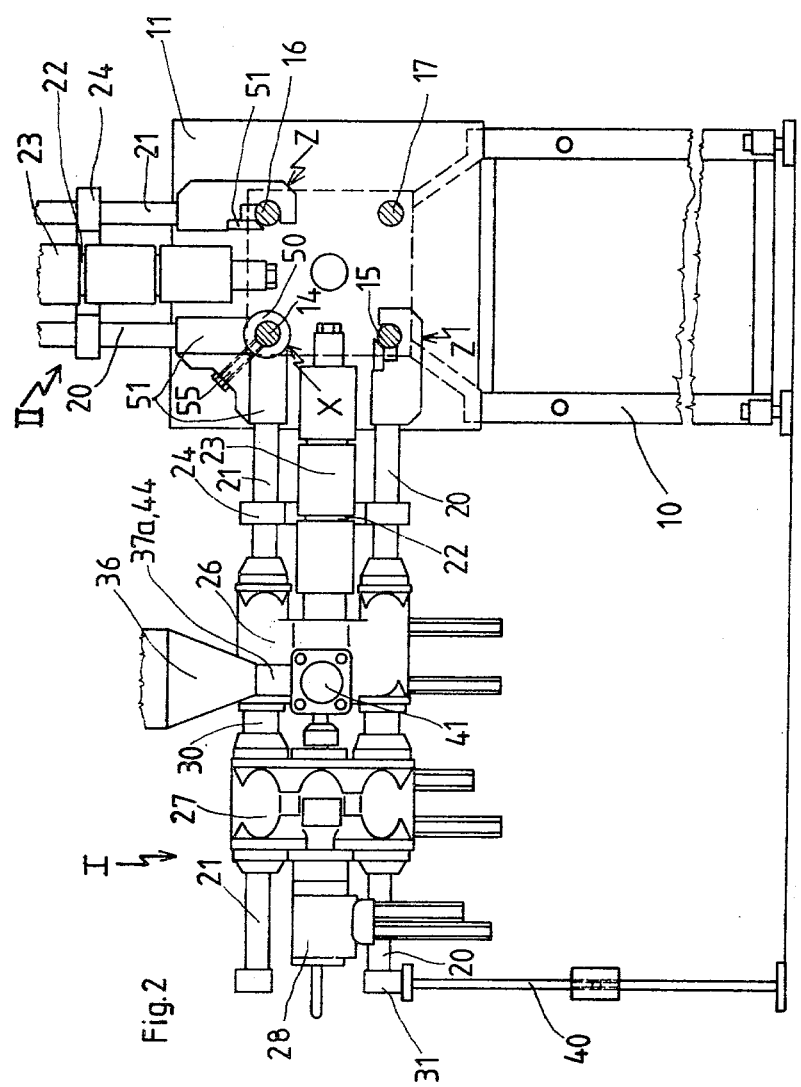

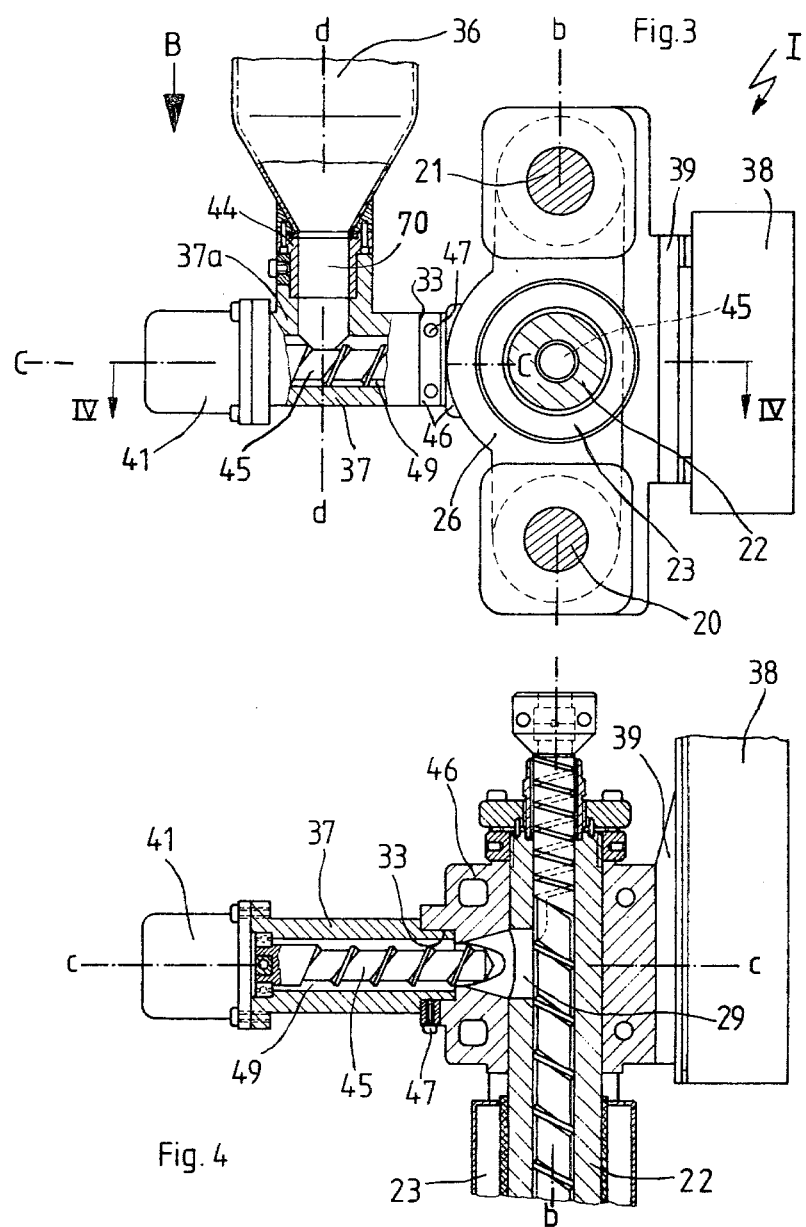

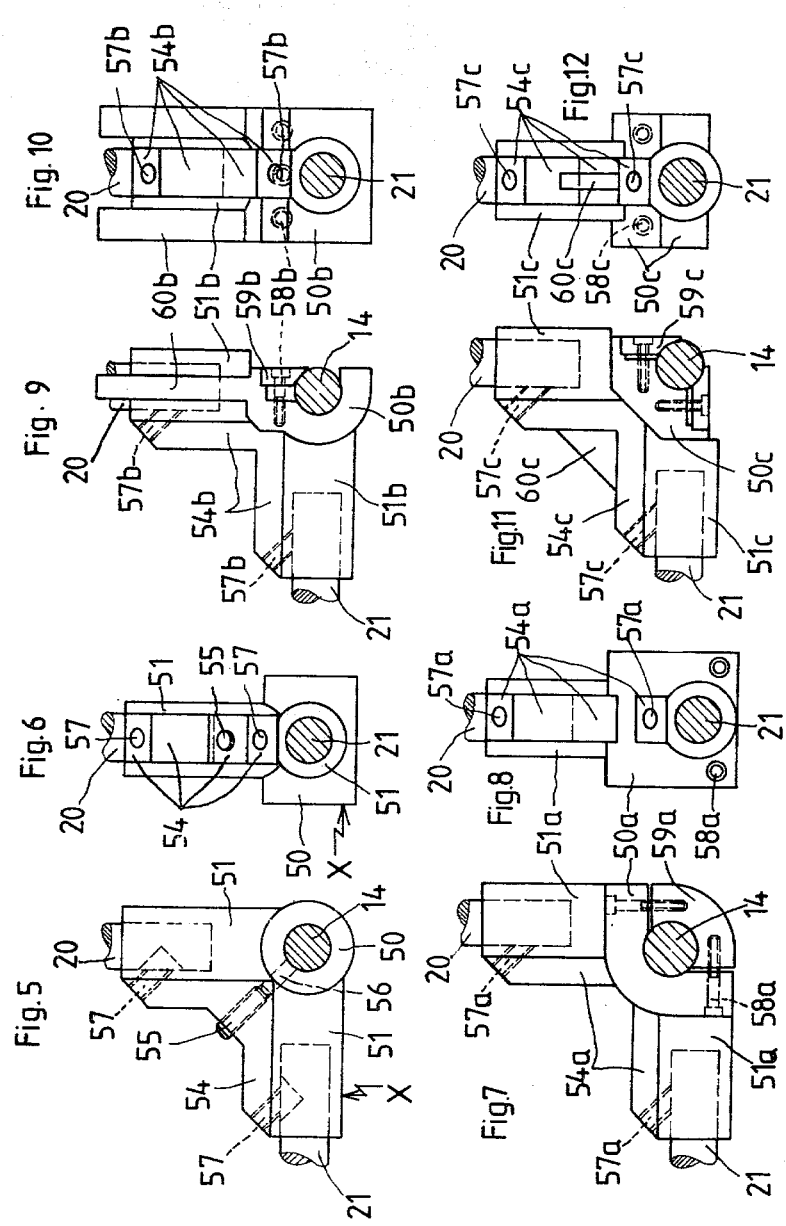

INJECTION UNIT FOR INJECTION MOLDING MACHINE

BACKGROUND OF THE INVENTION

1. Field of the Invention

The present invention relates to injection molding machines, and, more particularly, to an injection unit with an adjustable granulate supply hopper which are detachably mountable in several different orientations on the die closing unit of an injection molding machine.

2. Description of the Prior Art

The injection of raw material into a closed injection molding die takes place either perpendicularly to the die separation plane, i.e. in a direction which coincides with the axis of die opening and closing movement, through an aperture in the stationary die carrier plate, or it takes place in the die separation plane, in a direction which is perpendicular to the movement axis of the die closing unit. Under certain circumstances, it may be desirable or necessary to inject simultaneously through the stationary die carrier plate and from one or more directions in the die separation plane.

An injection unit commonly has two parallel tie rods which carry the plastification cylinder and its drive on a longitudinally movable carrier bridge, the front extremities of the tie rods being attached to the die closing unit and the rear extremities being supported on the machine base, if necessary. It is known from the prior art to arrange such an injection molding machine in axial alignment with the die closing unit, for injection through the stationary die carrier plate, in which case the tie rods of the injection unit are preferably mounted in alignment with the two tie rods of the die closing unit, using suitable mounting sockets or the like. It is also known to arrange such an injection unit vertically above the die closing unit, in which case two tie rods of the injection unit are attached to the top of the stationary die carrier plate, or the two tie rods of the die closing unit, so that the injection unit is aimed for injection into the die separation plane from above. Both arrangements are well known and are disclosed in U.S. Pat. No. 3,086,244, for example. The same application also suggests the possibility of arranging the die closing unit itself in a vertical orientation, in which case an axially oriented injection unit would have to be arranged vertically above the die closing unit, while lateral injection in the die separation plane would require a horizontally arranged injection unit.

The selective horizontal or vertical orientation of the injection axis requires special adaptive capabilities of the supply hopper for the plastic granulate which is being fed into the plastification cylinder of the injection unit. Because the granulate is normally fed into the plastification cylinder under gravity, the granulate hopper must be made adjustable in its orientation relative to the injection unit axis. In U.S. Pat. No. 3,086,244, this adjustability is being achieved by using a supply hopper which is rotatably adjustable about the axis of an inclined connecting channel to the plastification cylinder, the hopper itself having a body which is angled-off from this adjustment axis. Such a rotatable hopper makes it possible to use the injection unit in either a horizontal or a vertical orientation, requiring merely a half-turn rotation of the hopper, for a substantially vertical orientation of the hopper in both cases.

One disadvantage of this type of hopper is that its body is one-sided, i.e. that its geometry deviates from that of a body of rotation and that it is therefore unsuitable for the use of a granulate stirring device inside the hopper.

Even with the aforementioned adjustability in the hopper connection, the injection unit is still limited to one of two mounting orientations: horizontal, with the tie rods side-by-side, or vertical. It follows that, when two or more injection units had to be arranged for injection into the die separation plane, this could only be done with a vertically oriented die closing unit.

From German Gebrauchsmuster (Utility Model) No. 66 03 267 it is known to connect a vertical hopper to a vertically oriented plastic extrusion cylinder by means of a short horizontal connecting cylinder which has a rotating feed screw arranged in its bore. This prior art device is specifically designed for the processing of liquified PVC into tubular parisons which are being fed into a bottle blowing die. The suggested application of this device does not involve the plastification of granular raw materials, but is in fact intended to avoid such plastification.

SUMMARY OF THE INVENTION

Underlying the present invention is the primary objective of devising an improved injection unit with an adjustable hopper connection and an injection unit mounting arrangement which permit the attachment of the injection unit in previously known orientations as well as in various additional orientations which, heretofore, have not been possible. Another objective of the invention is to arrange the adjustable hopper connection in such a way that it allows for the use of a straight, round hopper which is compatible with a rotary granulate stirring device.

The present invention proposes to attain this objective by suggesting, in connection with an injection unit of the type which has two parallel tie rods, a hopper mounting arrangement which allows for the optional installation of a connecting cylinder between the intake chute of the plastification cylinder and the discharge chute in the base of the hopper, with a mechanical conveying device arranged in the connecting cylinder, so that the latter can have a horizontal orientation.

In a preferred embodiment of the invention, it is further suggested that the connecting cylinder be rotatable or angularly resettable about its longitudinal axis by means of releasable clamping means which attach the connecting cylinder to the plastification cylinder, so that the hopper can be adjusted for a vertical orientation in any mounting arrangement of the injection unit in which the axis of the connecting cylinder is horizontal. This includes all possible injection directions in the die separation plane, in the case of a horizontal die closing unit, as well as axial injection through the stationary die carrier plate of such a die closing unit, provided the injection unit is arranged with its two tie rods in vertical rather than horizontal alignment. In the case of a vertically oriented die closing unit, it also makes possible the arrangement of the injection unit below the injection molding die.

For added versatility, the present invention also makes it possible to directly mount the hopper on the plastification cylinder in the case of a horizontally oriented injection unit which has its two tie rods arranged side-by-side. This situation applies to axial injection into a horizontal die closing unit and to injection in the die separation plane of a vertical die closing unit. When the hopper is mounted directly on top of the hopper plastification cylinder, the base of the hopper is seated on the plastification cylinder, in a way which is known from the prior art, and the granulate is fed into the plastification cylinder under gravity. The optional connecting cylinder of the invention and the plastification cylinder have identical intake chutes, so that the discharge chute of the hopper can be connected to the one or the other with identical clamping means.

The present invention, by making it possible to arrange the injection unit with its tie rods aligned vertically above one another, also makes it possible to use a very simple mounting attachment for a horizontally oriented injection unit, for injection in the die separation plane, especially when the die closing unit is of the type which has four tie rods. In this case, the two tie rods of the injection unit are simply attached to the two nearest tie rods of the die closing unit. By using appropriate duplex mounting sockets on each tie rod of the die closing unit, it is even possible to mount four injection units for simultaneous injection in the die separation plane from four different directions. A die closing unit which only two tie rods makes such an arrangement more difficult, because the tie rods extend at mid-height of the die closing unit, rather than in its four corners.

It should be noted that, while prior art mounting structures would make it possible to arrange four horizontally oriented injection units for simultaneous injection in the die separation plane of a vertical die closing unit, such an arrangement presents difficulty for the simultaneous injection in the axial direction, because the mounting of a vertical injection unit on top of the vertical die closing unit is frequently impossible for lack of room, especially in the case of a large injection molding machine. For this and other reasons, it is therefore preferable to arrange the die closing units of large injection molding machines in a horizontal orientation.

BRIEF DESCRIPTION OF THE DRAWINGS

Further special features and advantages of the invention will become apparent from the description following below, when taken together with the accompanying drawings which illustrate, by way of example, several embodiments of the invention which are represented in the various figures as follows:

FIG. 2 shows the injection molding machine of FIG. 1 in a frontal end view, with a cross section through the die closing unit along line II—II, and featuring a third injection unit which is oriented vertically, for injection in the die separation plane;

FIG. 3 shows the injection unit I of FIGS. 1 and 2 at an enlarged scale and partially cross-sectioned, as seen in direction A of FIG. 1;

FIG. 4 shows the rear portion of the injection unit of FIG. 3 in a cross section taken along line IV—IV of FIG. 3;

FIGS. 5 and 6 show an elevation and a side view, respectively, of a duplex connecting socket for the injection unit tie rods, as used at X in FIG. 2;

FIGS. 7 and 8, 9 and 10, 11 and 12, respectively, show three different modifications of the duplex connecting socket of FIGS. 5 and 6;

DESCRIPTION OF THE PREFERRED EMBODIMENTS

Figure 1:
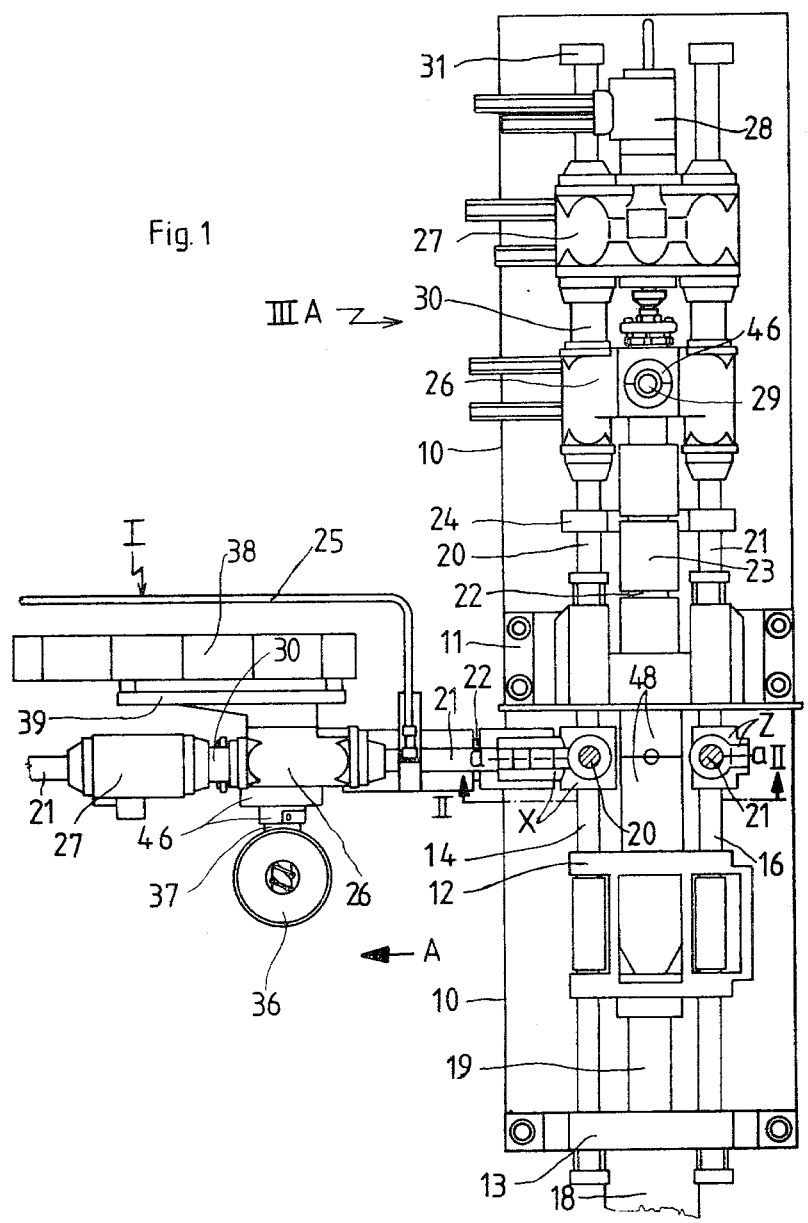
FIG. 1 shows, in a plan view, an injection molding machine with a horizontal die closing unit and two horizontally oriented injection units, one being arranged in the conventional way, for axial injection, the other being arranged sideways, for injection in the die separation plane, as suggested by the present invention.

In FIGS. 1 and 2 are shown, in a plan view and an end view, respectively, portions of an injection molding machine which features a horizontally oriented die closing unit and several injection units which are connected to the die closing unit, for the injection of plastic raw material into an injection molding die 48.

The die closing unit shown is a push-type die closing unit, having its injection molding die 48 arranged axially between a stationary die carrier plate 11 and a box-shaped movable die carrier frame 12, the latter being connected to a power cylinder 18 by means of a centrally located piston rod 19. The axial movements of the power cylinder 18 open and close the injection molding die 48. Between the stationary die carrier plate 11 and a likewise stationary head plate 13 of the hydraulic cylinder 18 are mounted four parallel tie rods 14, 15, 16 and 17 which support and guide the movable die carrier frame 12 for axial die opening and closing movements. The entire die closing unit is supported on a block-shaped machine base 10.

In FIG. 1, there can be seen an injection unit I which is oriented for horizontal injection in the die separation plane a—a of the injection molding die 48, and an injection unit IIIA which is arranged in axial alignment with the die closing unit, for injection through the stationary die carrier plate 11. The latter injection unit is arranged in the conventional manner, having its tie rods 20 and 21 arranged side-by-side and being fed the plastic raw material from above, under gravity, through its intake chute 29.

FIG. 2 shows that the injection molding machine is equipped with a third injection unit II which is oriented for vertical injection in the die separation plane a—a and of which only the lower portion is visible in the drawing.

Typically, an injection unit consists of a pair of parallel tie rods 20 and 21 which extend on opposite sides of a plastification cylinder 22. On the two tie rods ride two carrier bridges 26 and 27, the first carrier bridge 26 supporting the plastification cylinder near its rear extremity, and the second supporting bridge 27 carrying the hydraulic rotary drive 28 for a plastification screw which rotates inside the plastification cylinder (see FIG. 4). The supporting bridges 26 and 27 are movable along the tie rods 20 and 21, shifting the plastification cylinder 22 axially towards and away from the injection molding die 48 and moving the plastification screw axially in relation to the plastification cylinder during plastification and injection. Two tubular piston rods 30, surrounding the tie rods 20 and 21, form a part of the hydraulic drive system of the injection unit.

The forward extremities of the injection unit tie rods 20 and 21 are seated in mounting sockets of the stationary die carrier plate 11 (compare 11a in FIG. 19), and the rear extremities of the tie rods are supported in attachment collars 31 of skid-like injection unit supports 25.

Unlike the injection unit IIIA, which has its tie rods 20 and 21 aligned with a horizontal plane, the injection units I and II have their tie rods aligned with a vertical plane, i.e. with the die separation plane a—a. It follows that both injection units have their plastification cylinder intake chute oriented horizontally, so that gravity can no longer be relied upon to feed the plastic raw material into the plastification cylinder. Obviously, the hopper 36 which supplies the plastic raw material to the injection unit has to be arranged vertically in each case. In order to achieve this for differently oriented injection units, the invention suggests the use of a horizontal connecting cylinder 37 which, as can be seen in FIGS. 3 and 4, has one extremity mounted in a central hub portion 46 of the supporting bridge 26 while, in turn, supporting the supply hopper 36. The arrangement of a rotational seat 33—or, alternatively, of an angularly resettable attachment—between the connecting cylinder 37 and the hub portion 46 makes it possible to orient the hopper axis d—d vertically, regardless of whether the injection unit itself is oriented horizontally or vertically.

The plastic material supply hopper 36 is preferably of symmetrical shape, having the shape of a body of rotation, so that it is possible to arrange a granulate stirring device inside the hopper, if necessary. To the extremity of the tapered bottom portion of the hopper is attached a tubular connector 44 which is engaged in a matching clamping seat of a connecting socket 37a of the connecting cylinder 37, located near the distal extremity of the latter. The clamping seat for the tubular connector 44 of the hopper 36 is preferably identical with the rotational seat 33 for the attachable extremity of the connecting cylinder 37, so that, for a vertically oriented plastification cylinder intake chute 29, the hopper 36 can be attached directly to the hub portion 46. Two clamping screws 47 secure the connecting cylinder 37 or the connector 44 of the hopper base to the rotational seat 33.

The connecting cylinder 37 has a cylindrical bore which serves as a horizontal granulate conveying channel 49, in cooperation with a rotatable conveying screw 45 to which is connected a drive motor 41. The plastic granulate thus drops from the hopper 36 vertically into the conveying channel 49 of the connecting cylinder 37, via the vertical discharge channel 70 formed by the connector 44 and the socket 37a. From there, the granulate is mechanically advanced in a horizontal direction to the intake chute 29 of the plastification cylinder 22. The hopper 36 and the connecting cylinder 37 thus form a unit which is rotationally adjustable about the horizontal axis c—c of the connecting cylinder 37, regardless of the orientation of the injection unit within the vertical plane b—b. The angle of rotatability or angular resettability of the connecting cylinder 37 in its clamping seat 33 should be at least 90°.

The drive motor 41 which turns the conveying screw 45 may be a dc-motor with an adjustable torque, or it may be a hydraulic motor of low torque, so that the conveying screw 45 will stall, rather than cause jamming, should there be a backup of plastic material in the plastification cylinder 22. The screw pitch of the conveying screw 45 is preferably larger than the screw pitch of the plastification screw inside the plastification cylinder 22.

FIG. 1 also shows that the horizontally extending "upended" injection unit I carries on the back side of its supporting bridge 26 a box-like structure 39 with temperature controls 38. Behind this structure extend the skids 25. FIG. 2 also shows that the lower injection unit tie rod 20 is supported on the floor outside the machine base 10 by means of a conventional attachment collar 31 and a height-adjustable leg 40.

The near extremities of the injection unit tie rods 20 and 21 are attached to two of the four die closing unit tie rods 14–17. This mounting arrangement is extremely simple and efficient, because the proposed clamping attachment on the tie rods of the die closing unit offers a convenient axial adjustability which readily accommodates interchangeable injection molding dies which may have their die separation plane a—a spaced at different distances from the stationary die carrier plate 11. Such a change in spacing merely requires a corresponding axial shift of the injection units along the tie rods 14–17. Previously, in contrast, to the extent that injection in the die separation plane a—a was feasible, it was primarily performed with a vertical injection unit, and such a unit was mounted on a special support on the stationary die carrier plate 11.

FIG. 2 shows the mounting arrangement for the horizontal injection unit I and for an additional vertical injection unit II on the four die closing unit tie rods 14—17. Such a mounting arrangement requires one attachment member X with duplex attachment sockets attached to the tie rod 14 and two attachment members Z with single attachment sockets attached to the tie rods 15 and 16. In the case of the attachment member Z, the invention proposes the use of a simple open bracket and a cooperating wedge piece which, when clamped tight by screws, produces a firm connection. In the case of the duplex attachment member X, the invention suggests several embodiment possibilities in FIGS. 5 through 12.

The attachment member of FIGS. 5 and 6, for example, has a closed hub portion 50 with which it is seated on the tie rod 14 of the die closing unit, a set screw 55 and an intermediate pin 56 providing the clamping. The two attachment sockets 51 extend at right angles from the hub portion 50, being reinforced by means of a rib structure 54 which also serves to accommodate the threaded bores 57 for two tie rod clamping screws and a threaded bore for the set screw 55.

In the embodiment of FIGS. 7 and 8, the hub portion 50a of the attachment member is split into two parts along a horizontal and a vertical slit, and the two parts are clamped together by means of clamping bolts 58a. Otherwise, the arrangement of the duplex attachment sockets is similar to that of FIGS. 5 and 6. The split hub portion, however, permits removal and attachment of the member on the die closing unit tie rod 14, without the need for disconnecting and axially retracting the tie rod 14.

The embodiment of FIGS. 9 and 10 resembles that of the simple attachment member Z, the hub portion having been replaced by an open bracket 50b, and clamping being obtained by means of a wedge piece 59b and clamping screws 58b. The attachment sockets 51b for the two injection unit tie rods 20 and 21 are again reinforced by a rib structure 54b, while the upper mounting socket is further reinforced by means of two lateral ribs 60b.

Lastly, the embodiment of FIGS. 11 and 12 shows a combination of the features of the two last-described embodiments, inasmuch as three-quarters of the hub portion 50c are removed and replaced by two wedge pieces 59c and clamping screws 58c. The rib structure 54c includes a reinforcement rib 60c.

Figure 13:
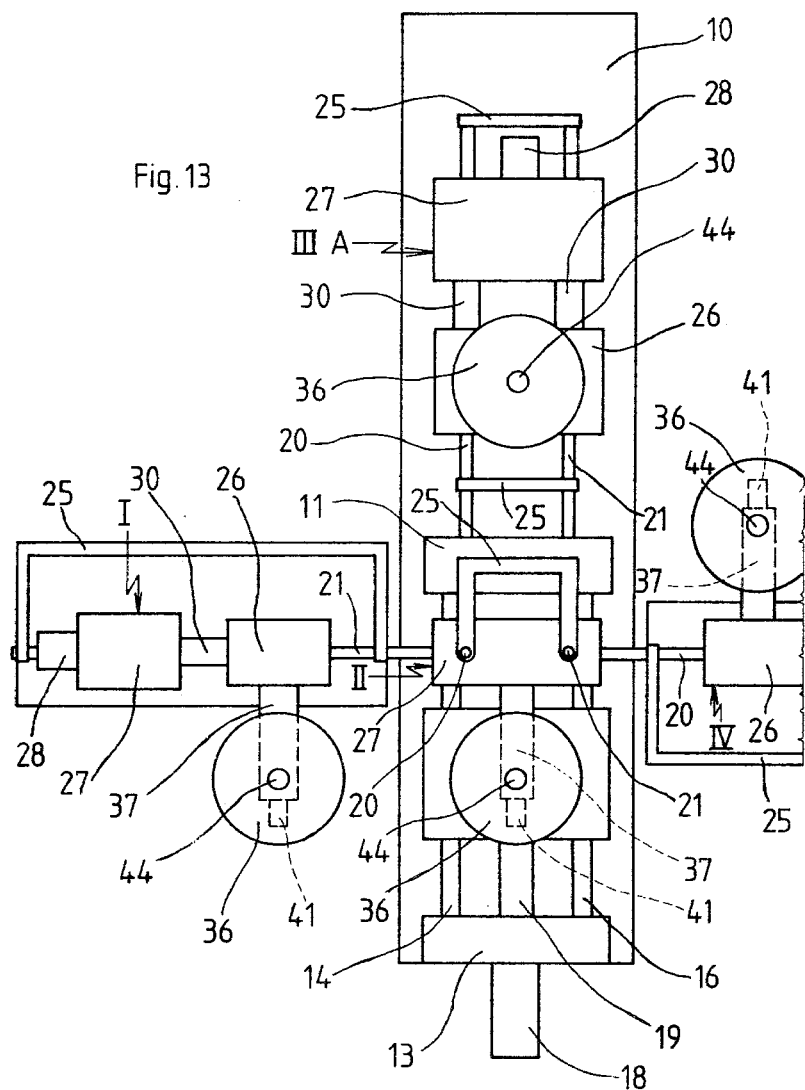
FIG. 13 is a schematic representation of an injection molding machine, shown in a plan view and equipped with four injection units, three of them being oriented for injection in the die separation plane and one being oriented for axial injection.
Figure 14:
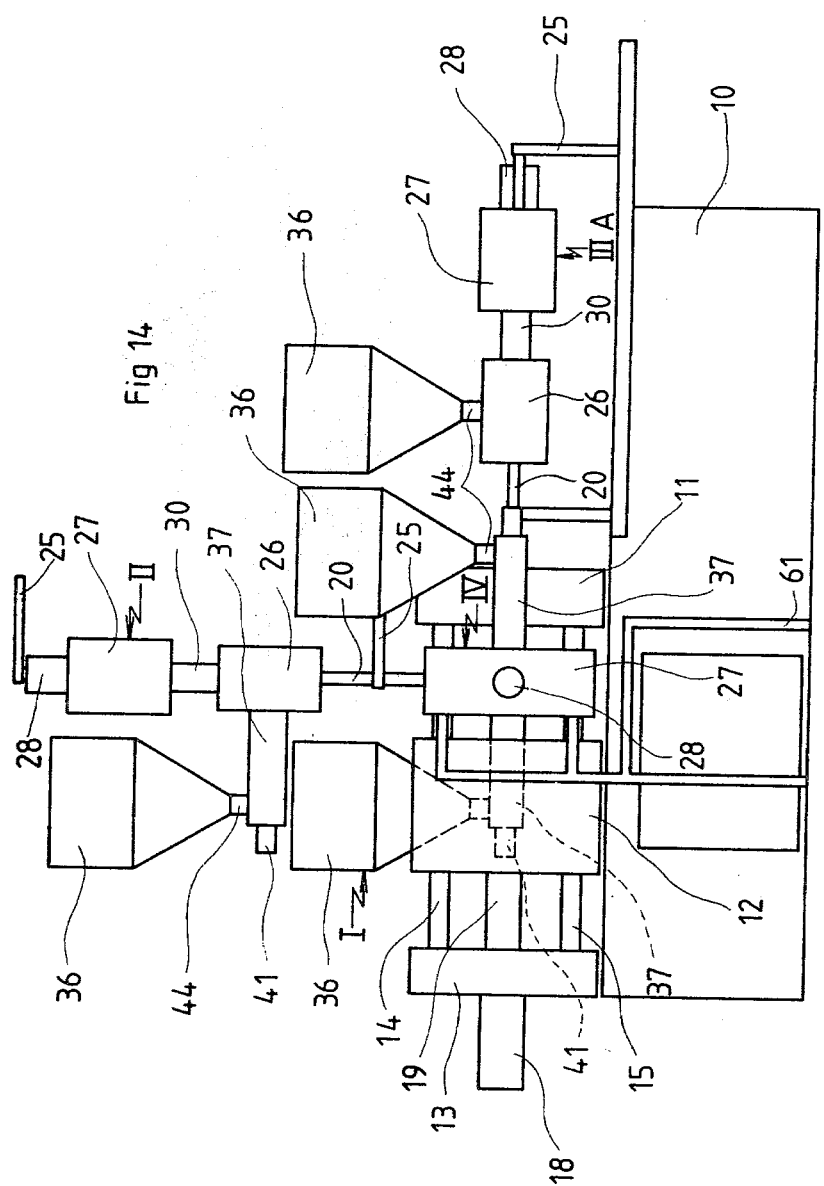
FIG. 14 is a schematic frontal elevation of the injection molding machine of FIG. 13.

In FIGS. 13–16 are given schematic representations of different injection molding machine arrangements which are made possible by the present invention. FIGS. 13 and 14, for example, show an injection molding machine is equipped with four injection units of which three are arranged for injection in the separation plane of the injection molding die and one is arranged in the conventional manner, for axial injection through the stationary die carrier plate 11. With the exception of the additional injection unit IV, this arrangement corresponds to that which has been described further above in connection with FIGS. 1–4. The additional horizontal injection unit IV is preferably identical with the previously described horizontal injection unit I.

The four supply hoppers 36 are oriented vertically, three of them requiring a horizontal connecting cylinder 37, while one is seated directly on top of the injection unit IIIA, in the conventional gravity feed arrangement. FIG. 14 also suggests the possibility of replacing the injection unit supporting skids with short supporting struts 25, as well as the possibility of supporting the "upended" horizontal injection units I and IV by means of special floor supports 61.

Figure 15:
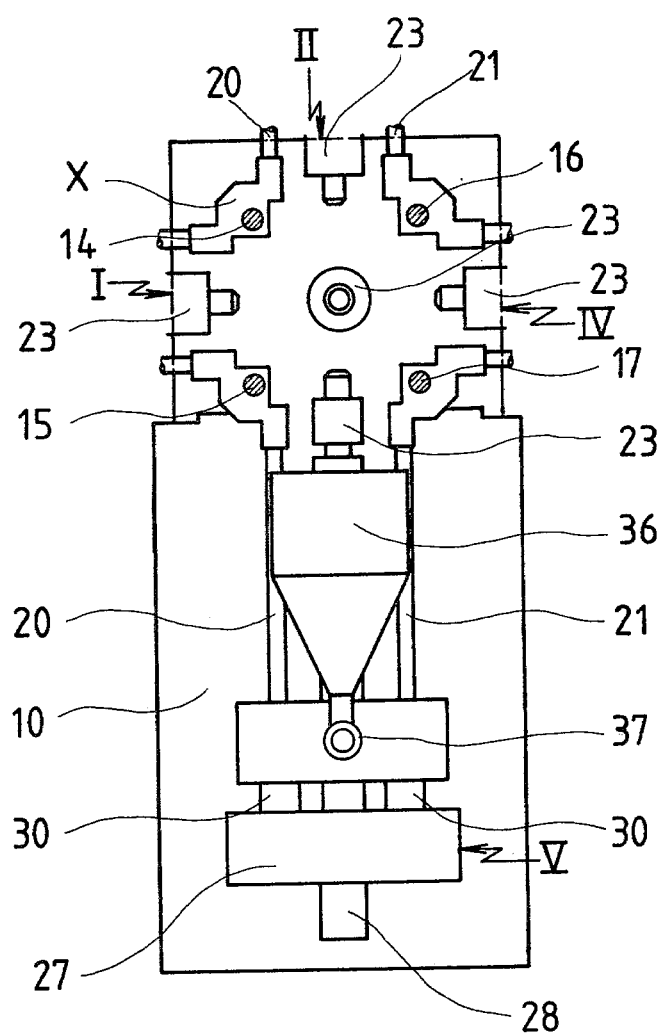
FIG. 15 is likewise a schematic representation of an injection molding machine, showing in a lateral elevation an arrangement which is capable of accommodating four injection units which simultaneously inject in the die separation plane of a horizontally oriented die closing unit.

FIG. 15 shows the possibility of arranging a fourth injection unit V in the die separation plane, for vertical injection from below the die closing unit. This may require a somewhat taller machine base 10, in order to accommodate the length of the injection unit V. The use of a full complement of injection units for injection in the die separation plane further simplifies their attachment to the four tie rods 14–17 of the die closing unit, inasmuch as it can be accomplished by means of four identical attachment members X with duplex mounting sockets.

Figure 16:
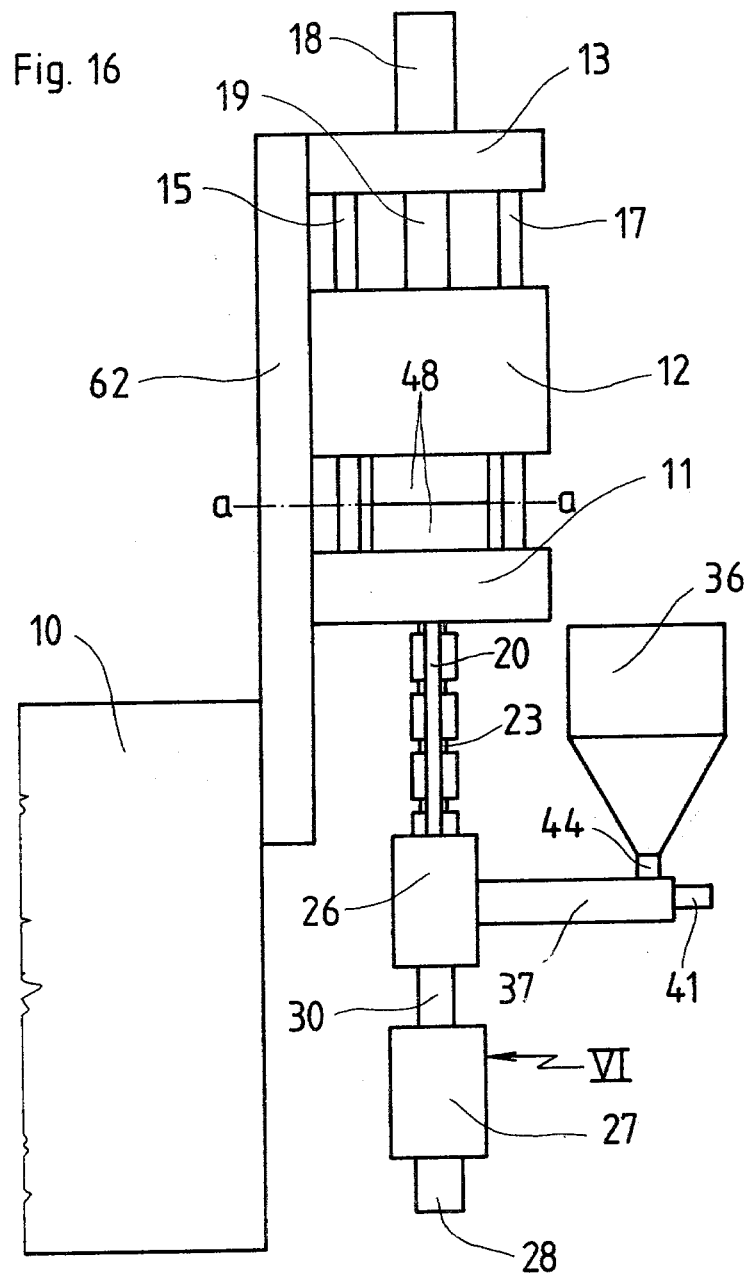
FIG. 16 is a schematic side elevation of a vertically oriented die closing unit, where a vertically oriented injection unit is arranged axially underneath the die closing unit, for axial injection into the injection molding die.

FIG. 16 shows an injection molding machine which features a vertically oriented die closing unit mounted on a carrier frame 62. The latter is attached to the machine base 10 by means of a pivot connection (not shown) for the optional repositioning of the die closing unit into a horizontal orientation. An injection unit VI is shown to be arranged below the die closing unit, for axial injection through the stationary die carrier plate 11. The mounting arrangement of the injection unit VI is essentially unchanged from that used for the horizontal die closing unit of FIGS. 1 and 2, but, due to the horizontal orientation of the plastification cylinder intake chute, it now requires the use of a horizontal connecting cylinder 37 and of a mechanical conveying drive 41.

Figure 17:
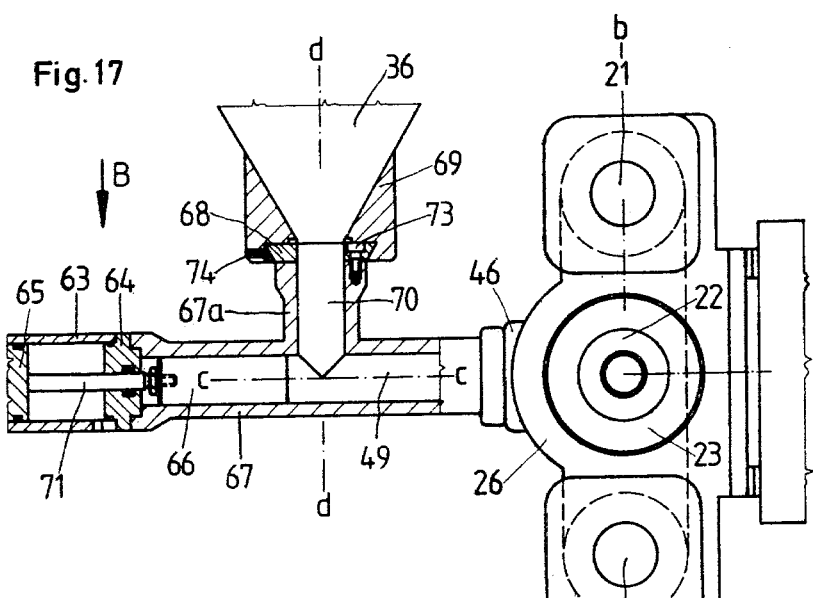
FIG. 17 is comparable to FIG. 3, showing a modified hopper connecting cylinder and mechanical granulate conveying device.
Figure 18:
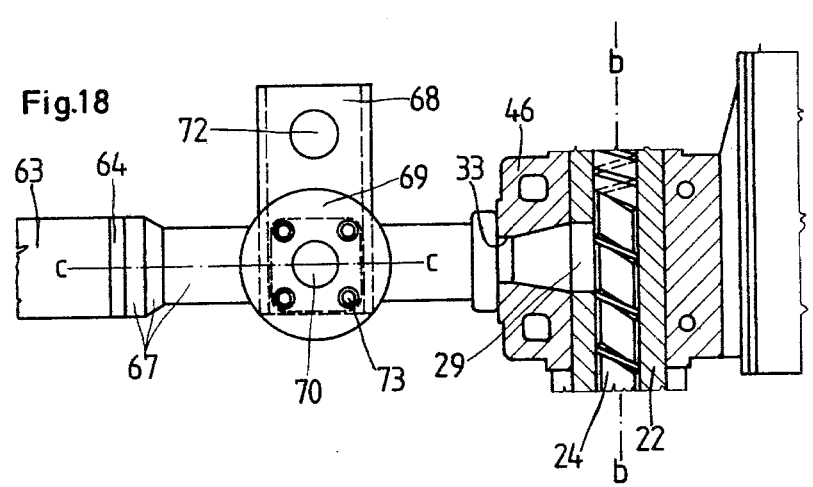
FIG. 18 shows the structure of FIG. 17 in a partially cross-sectioned plan view.

In FIGS. 17 and 18 is shown a modified embodiment of a horizontal connecting cylinder and mechanical granulate conveying device which may take the place of the connecting cylinder 37 and conveying screw 45 of FIGS. 3 and 4. In the embodiment of FIG. 17, the connecting cylinder 67 is again rotatably or angularly resettably attached to a seat 33 in the hub portion 46 of the supporting bridge 26. Inside the bore of the connecting cylinder 67 is arranged an axially reciprocating conveying plunger 66 which is driven by the piston 65 of a hydraulic cylinder 63. The latter is attached to the connecting cylinder 67 by means of a cylinder end flange 64. A piston rod 71 connects the drive piston 65 to the conveying plunger 66.

In the midportion of the horizontal connecting cylinder 67 is arranged a connecting socket 67a whose vertical bore serves as a discharge chute 70 for the granulate which is contained in the supply hopper 36. The latter has a base body 69 with a dovetail-shaped groove which is engaged over a transversely extending matching guide plate 68. The latter is attached to the top face of the connecting socket 67a by means of screws 73. The base body 69 of the hopper 37, in turn, is releasably clamped to the guide plate 68 by means of set screws 74. This quick-release clamping arrangement for the hopper 36 makes it possible to shift the latter along the guide plate 68 to a position in which the bottom aperture of the hopper is aligned with an opening 72 in the guide plate 68, thus making it possible to empty the supply hopper 36 of its contents, without removing it from the injection unit. The reciprocating movements of the drive piston 65 and conveying plunger 66 are preferably controlled by means of limit switches (not shown) which may be associated with the connecting cylinder 67, or with the drive cylinder 63.

Figure 19:
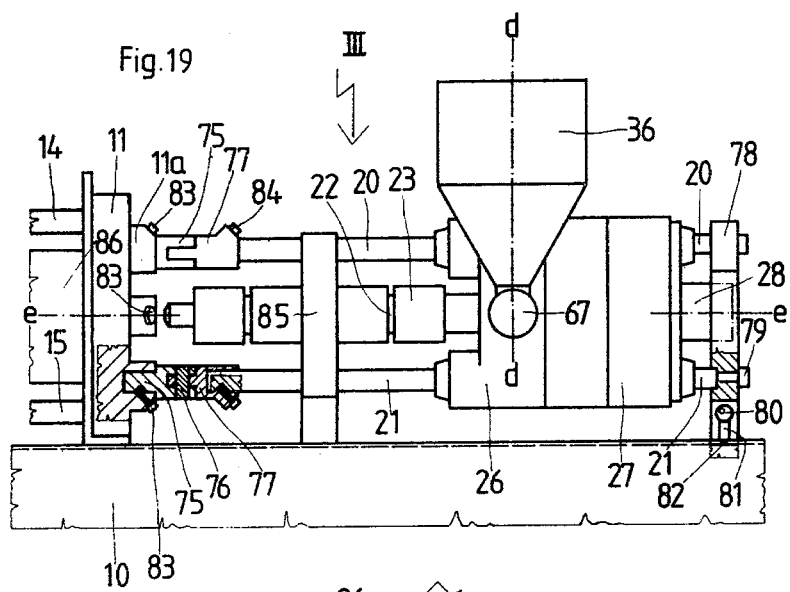
FIG. 19 shows portions of an injection molding machine, in a frontal elevation, with a horizontal die closing unit and an axially oriented injection unit having vertically aligned tie rods featuring a swivel connection.
Figure 20:
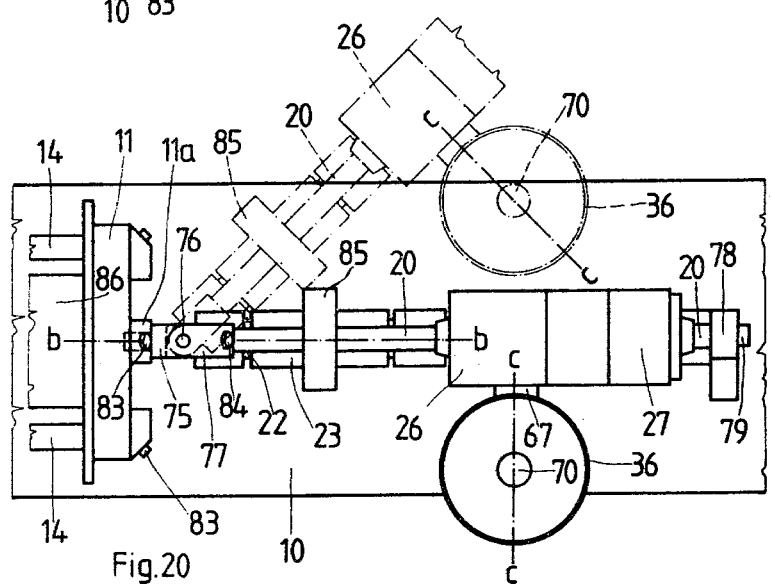
FIG. 20 shows the structure of FIG. 19 in a plan view.

FIGS. 19 and 20 illustrate the possibility of arranging an axially injecting injection unit III in an "upended" orientation, so that the plane b—b defined by the injection unit tie rods 20 and 21 is vertical, while coinciding with the injection axis e—e of the die closing unit. It follows that the plastification cylinder intake chute is oriented horizontally, so that it requires the arrangement of a connecting cylinder 67 and a mechanical granulate conveying device between the supply hopper 36 and the supporting bridge 26 of the injection unit.

By mounting the axially oriented injection unit III in this manner, it becomes possible to provide a vertical pivot axis 76 in the vicinity of the forward extremities of the tie rods 20 and 21, making it possible for the injection unit III to be swivelled sideways about this pivot axis, as implied in FIG. 20, to a position which is substantially perpendicular to the injection axis e—e. The pivot connection of each injection unit tie rod is formed by a pivot base 75, a tie rod socket 77, and a pivot pin, the pivot base 75 being retained in the bore of a conventional tie rod mounting socket 11a of the stationary die carrier plate 11. Clamping screws 83 and 84 secure the pivot bases 75 in their respective mounting sockets 11a and the tie rods 20 and 21 in their pivotable tie rod sockets 77.

The pivotability of the injection unit III provides access to the injection nozzle at the forward extremity of the plastification cylinder, thereby eliminating the need for disconnecting the injection unit from the die closing unit. However, this feature makes it necessary to have the injection unit equipped with positioning means which align and clamp the injection unit in its operating position, in the injection axis e—e. This end is achieved by means of a vertical brace 78 which is clamped to the rear extremities of the injection unit tie rods 20 and 21 by means of bolts 79 and which carries a clamp lock 81 with which it is releasably clampable to the top side of the machine base 10. The clamp lock 81 consists essentially of an eccentric shaft 80 which raises and lowers a locking member into and out of a positioning bore 82 in the machine base 10.

The injection unit III of FIGS. 19 and 20 also features a supporting bridge 85 which is axially movable along the tie rods 20 and 21 and which provides additional support for the plastification cylinder 22 and its heater jackets 23. The supporting bridge 85 may at the same time also serve as an attachment point for skids (not shown) which support the injection unit when it is swivelled to one side.

The arrangement of an axially injecting injection unit as suggested in FIGS. 19 and 20, in combination with one or more injection units oriented for injection in the die separation plane a—a, as suggested in FIGS. 1 and 2 and FIGS. 13–15, for example, make it possible to use substantially identical injection units in all injection positions, each injection unit being equipped with a horizontal connecting cylinder which carries its supply hopper.

On the other hand, the "upended" injection unit of FIGS. 19 and 20 also makes it possible to pivot the entire die closing unit into a vertical position or any intermediate inclined position, while having at all times a vertically oriented supply hopper. Because the axis about which the die closing unit is pivoted is parallel to the axis c—c of the connecting cylinder, the latter merely requires an identical opposite angular adjustment.

It should be understood, of course, that the foregoing disclosure describes only preferred embodiments of the invention and that it is intended to cover all changes and modifications of these examples of the invention which fall within the scope of the appended claims.

I claim the following:

1. In an injection unit which serves to plastify plastic raw material inside a plastification cylinder and to inject it into the injection molding die of an injection molding machine, which injection unit is adapted for selective attachment to the die closing unit of the injection molding machine in several different orientations, for injection in the die separation plane or perpendicularly thereto, in such an injection unit, an adjustable mounting structure for a raw material hopper comprising in combination:

a substantially horizontally oriented tubular connecting cylinder serving as a raw material conveying channel and forming with the plastification cylinder of the injection unit a right-angle cylinder connection through which the bores of the two cylinders form an intake chute;

means associated with the connecting cylinder for mechanically conveying the raw material along the conveying channel to the plastification cylinder;

a hopper connection near the distal other extremity of the connecting cylinder which is likewise a right-angle connection and which includes a substantially vertically oriented discharge chute between the base of the raw material hopper and the conveying means of the connecting cylinder; and a seat and clamping means associated with the cylinder connection, giving the connecting cylinder an angular resettability about its axis, so that the raw material hopper can be oriented upright, for gravity discharge into the connecting cylinder, independently of the orientation of the plastification cylinder within a vertical plane, as determined by said seat and clamping means.

2. A hopper mounting structure as defined in claim 1, wherein
the cylinder connection and the hopper connection include similarly shaped tubular connectors on the rear extremity of the connecting cylinder and on the base of the hopper, and matching seats in a connecting hub portion of the plastification cylinder and in a connecting socket of the connecting cylinder, respectively, so that the connecting cylinder can be omitted from the hopper mounting structure, and the hopper base can be connected directly to the hub portion of the plastification cylinder, when the injection unit is so oriented that the intake chute to its plastification cylinder and the associated seat are oriented substantially vertically.

3. A hopper mounting structure as defined in claim 1 or claim 2, wherein
the tubular connector of the connecting cylinder and the seat and clamping means which are associated with the plastification cylinder cooperate to form a rotational connection for random angular resettings of the hopper and connecting cylinder about the connecting cylinder axis.

4. A hopper mounting structure as defined in claim 1 or claim 2, wherein
the tubular connector of the connecting cylinder and the seat and clamping means which are associated with the plastification cylinder cooperate to form a connection for predetermined discrete angular resettings of the hopper and connecting cylinder about the connecting cylinder axis.

5. A hopper mounting structure as defined in claim 1 or claim 2, wherein
the raw material conveying means includes a conveying plunger in the bore of the connecting cylinder and a hydraulic drive cylinder which imparts a reciprocating motion to the conveying plunger.

6. A hopper mounting structure as defined in claim 1 or claim 2, wherein
the hopper connection includes a vertically oriented connecting socket on the connecting cylinder and a horizontally oriented guide member at the top of the connecting socket;
the base of the raw material hopper engages the guide member so as to be laterally displaceable therealong, between a normal discharge position in which the discharge channel portions of the hopper base and of the connecting socket are in vertical alignment and a removed position on the guide member in which the hopper can be emptied by discharging its contents outside the discharge channel; and the hopper connection further includes clamping means defined between the hopper base and the connecting socket for holding the hopper in its normal position.

7. A hopper mounting structure as defined in claim 1 or claim 2, wherein
the raw material conveying means includes a conveying screw in the bore of the connecting cylinder and a rotary drive connected thereto, including means for interrupting the rotation of the conveying screw in response to a condition of excessive raw material buildup in the intake chute.

8. A hopper mounting structure as defined in claim 7, wherein
the rotary drive is a hydraulically driven rotary motor of low drive torque which stalls under said raw material buildup condition, the motor thereby also serving as the rotation interrupting means.

9. A hopper mounting structure as defined in claim 7, wherein
the rotary drive is a dc-motor with an adjustable torque output which stalls under said raw material buildup condition, the motor thereby also serving as the rotation interrupting means.

10. A hopper mounting structure as defined in claim 1, wherein
the longitudinal axis of the plastification cylinder represents the injection axis;
the injection unit includes two injection unit tie rods which extend parallel to and on opposite sides of the plastification cylinder and form a part of a stationary support and guide structure of the injection unit, carrying a supporting bridge which is axially movable along the tie rods and of which the hub portion of the plastification cylinder is an integral part;
the die closing unit includes four die closing unit tie rods which are part of a rigid stationary frame and extend parallel to the center axis of the die closing unit along which the injection molding die is opened and closed perpendicularly to the die separation plane, the axes of the four tie rods being located at the four corners of a square which is centered about said center axis;
the injection unit is oriented for injection in the die separation plane, its two tie rods being aligned with said plane; and
the forward extremities of the injection unit tie rods are attached to two of the four die closing unit tie rods by means of attachment sockets which include seating bores for said tie rod extremities and means for releasably clamping the sockets to the die closing unit tie rods.

11. A hopper mounting structure as defined in claim 10, wherein
at least one of the tie rod attachment sockets is a duplex socket, having two seating bores which are oriented at right angles to each other and to the die closing unit axis, thereby permitting the attachment of the tie rods of at least a second injection unit which is also oriented for injection in the die separation plane and 90° removed from the first injection unit.

12. A hopper mounting structure as defined in claim 1, wherein
the die closing unit is arranged for opening and closing movements of the injection molding die, along the center axis of the die closing unit, and the unit includes a stationary die carrier plate supporting the stationary half of the injection molding die;
the injection unit is arranged axially behind said stationary die carrier plate and oriented for injection perpendicular to the die separation plane, its injection axis being the longitudinal axis of its plastification cylinder and coinciding with the center axis of the die closing unit;
the injection unit includes two tie rods which extend parallel to the plastification cylinder, vertically above and below the latter, and which form a part of a stationary support and guide structure of the injection unit, carrying a supporting bridge which is axially movable along the tie rods, said supporting bridge, in turn, carrying the plastification cylinder; and
the injection unit further includes two articulated tie rod connections for the attachment of the forward extremities of the two tie rods to the stationary die carrier plate of the die closing unit in such a way that a vertical pivot axis is formed about which the injection unit can be swivelled sideways, away from alignment with the center axis of the die closing unit.

13. A hopper mounting structure as defined in claim 12, wherein
each of the two articulated tie rod connections includes a pivot base which is insertable into and clampable inside a horizontal socket bore of the stationary die carrier plate and a cooperating tie rod socket which forms a vertical pivot axis with the pivot base and has a horizontal socket bore for the insertion and clamping therein of the associated tie rod extremity.

14. A hopper mounting structure as defined in claim 12, wherein
the injection unit further includes means for centering the injection unit support and guide structure in axial alignment with the die closing unit axis, and means for releasably locking it in place in the centered position.

* * * * *